United States Patent [19]
Goodwin, III

[11] Patent Number: 5,767,454
[45] Date of Patent: Jun. 16, 1998

[54] ELECTRONIC SCALE INCLUDING A FAULT-DETECTING ELECTRONIC DISPLAY MODULE

[75] Inventor: John C. Goodwin, III, Suwanee, Ga.

[73] Assignee: NCR Corporation, Dayton, Ohio

[21] Appl. No.: 735,423

[22] Filed: Oct. 22, 1996

[51] Int. Cl.⁶ .......................... G01G 23/18; G01G 19/52; H01H 31/02; G02F 1/1333
[52] U.S. Cl. .............................. 177/45; 177/50; 324/537; 324/538; 349/54
[58] Field of Search .................... 324/537, 538, 324/750, 772; 349/54; 345/50, 117; 177/50, 45, 177

[56] References Cited

U.S. PATENT DOCUMENTS

| | | | |
|---|---|---|---|
| 3,947,837 | 3/1976 | Bitterice | 340/274 R |
| 4,002,886 | 1/1977 | Sundelin | 235/61.7 R |
| 4,500,880 | 2/1985 | Gomersall et al. | 340/825.35 |
| 4,589,659 | 5/1986 | Yokoi et al. | 273/1 GC |
| 4,842,373 | 6/1989 | Tomofuji et al. | 350/336 |
| 4,940,934 | 7/1990 | Kawaguchi et al. | 324/158 R |
| 5,007,105 | 4/1991 | Kudoh et al. | 455/344 |
| 5,066,104 | 11/1991 | Mohebban et al. | 359/43 |
| 5,160,920 | 11/1992 | Harris | 340/765 |
| 5,172,314 | 12/1992 | Poland et al. | 364/401 |
| 5,187,471 | 2/1993 | Wagai et al. | 340/825.44 |
| 5,394,297 | 2/1995 | Toedter | 361/683 |
| 5,410,108 | 4/1995 | Williams et al. | 177/50 |

FOREIGN PATENT DOCUMENTS

| | | |
|---|---|---|
| 9303273 | 8/1993 | Denmark . |
| 0333136 | 9/1989 | European Pat. Off. . |
| 821260 | 10/1959 | United Kingdom . |

*Primary Examiner*—Renee S. Luebke
*Assistant Examiner*—Randy W. Gibson
*Attorney, Agent, or Firm*—Paul W. Martin

[57] ABSTRACT

An electronic scale including a fault-detecting electronic display module which can detect a crack in a display, a separation in a cable connected to the display, and a separation between the cable and a connector on a printed circuit board. The fault-detecting electronic display module includes the display, which displays a weight of an object, the cable, and a fault-detecting line extending around at least a portion of the perimeter of the electronic display and through the cable. The electronic scale also includes a load cell for sensing the weight of the object, and a controller coupled to the load cell and to the fault-detecting display module.

12 Claims, 2 Drawing Sheets

5,767,454

1

ELECTRONIC SCALE INCLUDING A FAULT-DETECTING ELECTRONIC DISPLAY MODULE

CROSS-REFERENCE TO RELATED APPLICATION

The present invention is related to the following commonly assigned and co-pending U.S. application:

"Fault-Detecting Electronic Display Modules For Electronic Display Systems", filed Nov. 15, 1994, invented by Wilkus, and having a Ser. No. 08/339,500.

BACKGROUND OF THE INVENTION

The present invention relates to electronic signage, and more specifically to an electronic scale including a fault-detecting display module.

Electronic scales are used in retail establishments. Scales may be stand-alone units, or part of bar code reading devices, such as optical bar code scanners. Electronic scales typically include displays for displaying the weight of an item. These displays are typically liquid crystal displays (LCDs).

LCDs may fail for several reasons. A disconnected or broken LCD connector cable can occur when the LCD is assembled poorly with the heated melt performed at an angle, or when a sharp edge of the glass of LCD cuts the connector cable when the LCD is being installed or handled. Cracked or broken LCD glass may be caused by damage from impact to the LCD from, for example, metal cans and other heavy objects.

Retailers are required to display proper weights on electronic scales. Retailers are subject to fines if the correct weight information is not displayed by the scale.

Therefore, it would be desirable to provide a circuit and method of detecting display failures in scales.

SUMMARY OF THE INVENTION

In accordance with the teachings of the present invention, an electronic scale including a fault-detecting display module is provided.

The fault-detecting electronic display module includes an electronic display, which displays a weight of an object, a cable coupled to the electronic display, and a fault-detecting line extending around at least a portion of the perimeter of the electronic display and through the cable. The electronic scale also includes a load cell for sensing the weight of the object, and a controller coupled to the load cell and to the fault-detecting display module.

A method of detecting a failure of an electronic display in an electronic scale is also disclosed and includes the steps of providing a fault-detection line within the display, extending the fault-detection line through a cable such that the fault-detection cable occupies two lines of the cable, coupling the cable to a connector on a printed circuit board by coupling the two ends of the two lines to corresponding first and second terminals in the connector, checking the continuity between the first and second terminals, and alerting an operator that weight information is unreliable if a separation is sensed between the first and second terminals.

It is accordingly an object of the present invention to provide an electronic scale including a fault-detecting display module.

It is another object of the present invention to provide an electronic scale including a fault-detecting display module that can detect cracked or broken glass.

2

It is another object of the present invention to provide an electronic scale including a fault-detecting display module that can detect disconnected, improperly connected, or broken connector cables to the LCDs.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
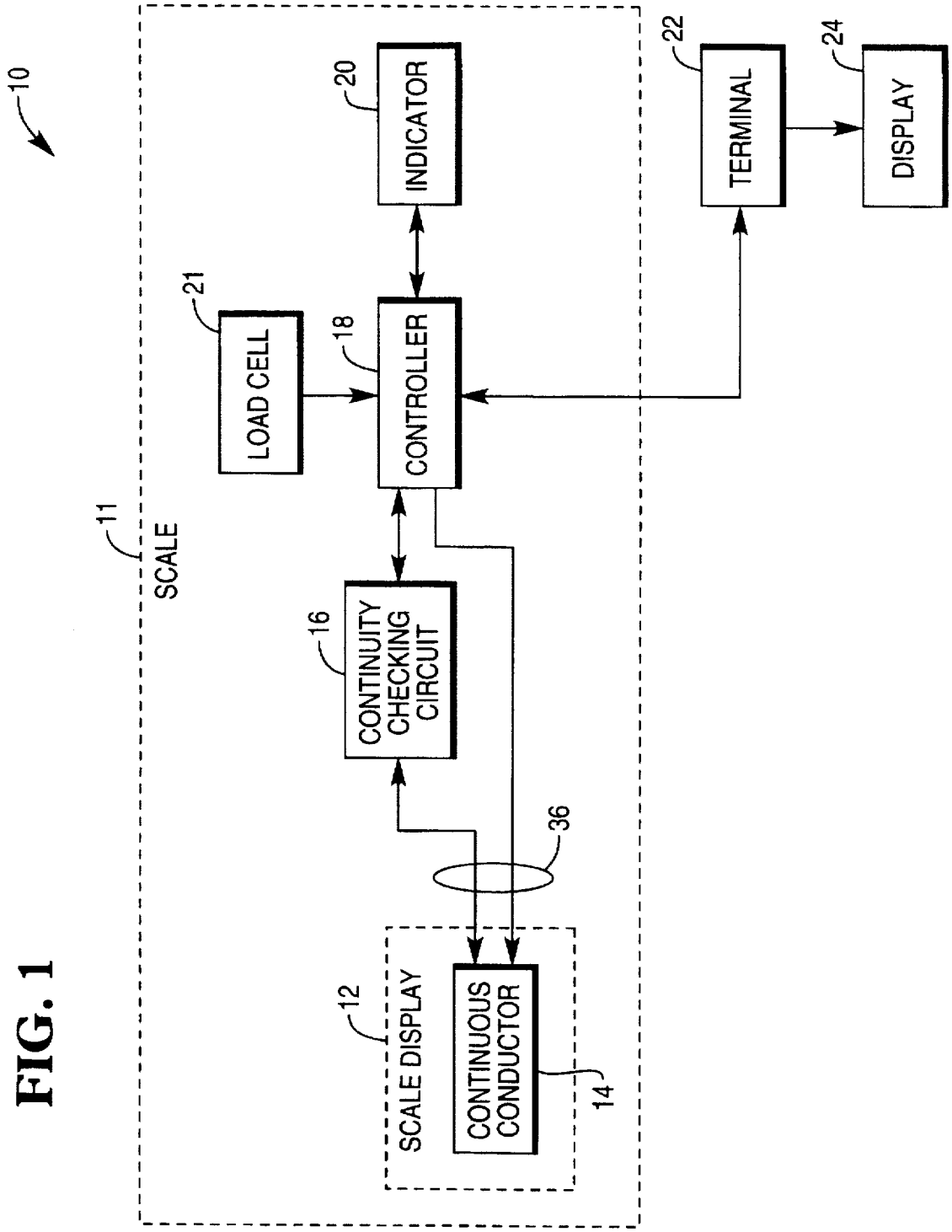
FIG. 1 is a block diagram of a store system.

Referring now to FIG. 1, a weighing system 10 includes electronic scale 11, terminal 22, and display 24.

Electronic scale 11 may be a stand-alone weighing apparatus or may be part of an optical bar code scanner or other type of bar code reader mounted within a checkout counter.

Bar code readers of the optical type typically include a laser diode, the light from which is focused and collimated to produce a scanning beam. A rotating mirror or group of mirrors directs the beam against a plurality of stationary mirrors to produce scan lines. A detector receives the returning light from a scanned item.

An item whose price is based on its weight is typically weighed, rather than scanned by a bar code reader.

Electronic scale 11 includes scale display 12, continuity checking circuit 16, controller 18, indicator 20, and load cell 21.

Scale display 12 displays weight information to an operator and is preferably a liquid crystal display (LCD). Scale display 12 includes a continuous conductor 14 which is secured to a high-resistance circuit, which is effectively an open circuit when display 12 is cracked.

Continuity checking circuit 16 monitors the electrical resistance of continuous conductor 14 for a resistance above a predetermined threshold resistance. If the resistance exceeds the threshold resistance, continuity checking circuit 16 sends a signal to controller 18.

Continuous conductor may be coupled to a cable 36 extending between continuity checking circuit 16 or be part of cable 36.

Controller 18 controls operation of scale 11. It receives weight signals from load cell 21 and displays weight information on scale display 12. When scale display 12 is cracked or when a portion of cable 36 is separated, controller 18 may stop displaying load cell weight information and/or send a signal to indicator 20 to alert the operator that weight information is no longer available for display or unreliable.

Controller 18 may also send a signal to terminal 22 when terminal 22 is coupled to scale 11. Terminal 22 may be any computer terminal, such as a computer terminal used to process retail transactions involving items weighed by electronic scale 11. In this capacity, scale 11 may be part of an optical bar code scanner. Terminal 22 sends a signal to display 24 to display purchased merchandise items, the prices of purchased merchandise items, and the weights of those merchandise items whose prices are based upon their weights.

Indicator 20 alerts an operator that scale display 12 may be cracked. Indicator 20 may include a visual indicator, such as a combination of green and red LEDs signifying normal operation and failure of scale display 12, respectively. In addition, indicator 20 may include an aural indicator, such as a beeper, either alone or in combination with the visual indicator.

Load cell 21 generates weight signals based upon the weight they support.

Figure 2:
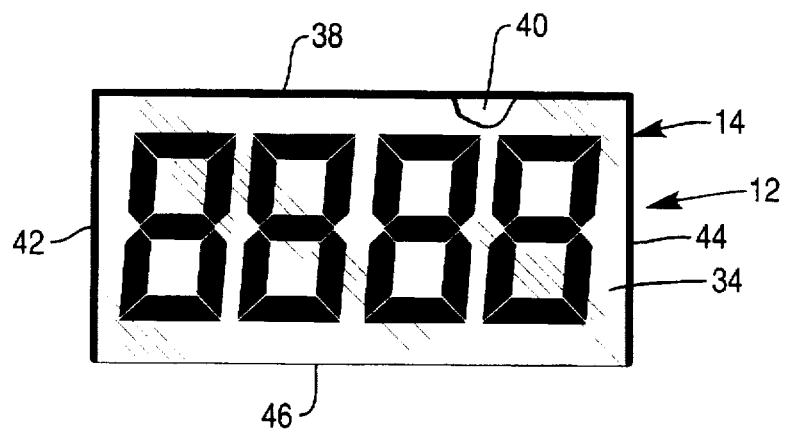
FIG. 2 is a front view of an LCD.
Figure 3:
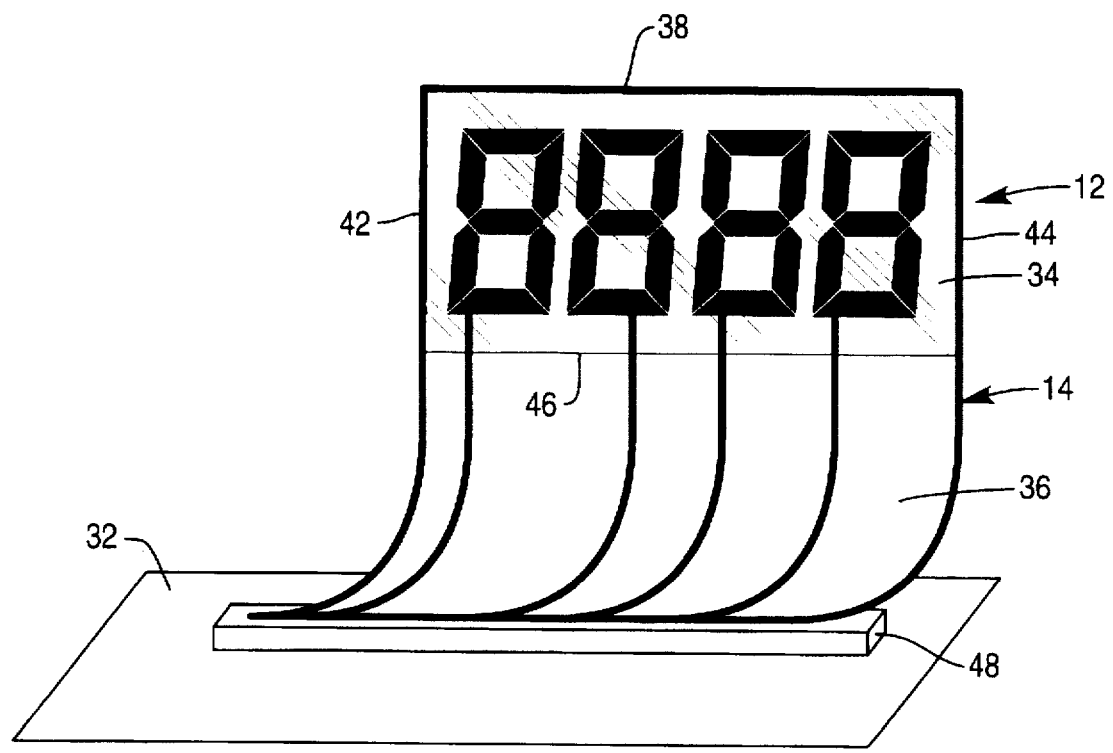
FIG. 3 is a perspective view of the LCD attached by a connector cable to a logic board.

Referring now to FIGS. 2 and 3, one embodiment of scale display 12 generally includes logic board 32 and cable 36.

Logic board 32 includes control circuitry for scale display 12 and may additionally include other circuitry, such as continuity checking circuit 16, controller 18, and indicator 20.

Continuous conductor 14 extends substantially around the perimeter of scale display 12. Continuous conductor 14 is preferably a conductive path which is placed on either side of cable 36. Cable 36 connects to connector 48 on logic board 32.

Scale display 12 includes liquid crystal substrate layer 40 underneath glass protective overlay layer 34 and continuous conductor 14 is positioned on liquid crystal substrate layer 40 under glass protective overlay layer 34.

In this preferred embodiment, scale display 12 is preferably of a generally rectangular configuration and continuous conductor 14 extends around the perimeter of scale display 12 along three of the four sides of scale display 12. Alternatively, continuous conductor 14 could extend around the perimeter of scale display 12 once along three of the four sides of scale display 12 and twice along the other side to yield four-sided protection. Cable 36 is preferably a substantially flat multi-wire flexible electrical conductor for connecting LCD 34 to logic board 32. Cable 36 is connected to scale display 12 along one side 46 of the two sides 38 and 46 of the substantially rectangular configuration and continuous conductor 14 extends around the perimeter of scale display 12 along the other one side 38 of the two sides 38 and 46 of the generally rectangular configuration and along the two sides 42 and 44 of the generally rectangular configuration.

This embodiment not only detects when scale display 12 is cracked, but also determines when cable 36 is not securely fastened to logic board 32 through mating connectors 48. This condition may result in whole or partial loss of displayed information, making any displayed information unreliable. Thus, continuity checking circuit 16 checks continuity between the connector terminals of the logic board connector, to which the ends of continuous conductor 14 are coupled through the associated cable connector.

The present invention also envisions that continuous conductor may extend along side 46, or that two adjacent conductors in cable 36 may be used, even though this scheme is less likely to detect when the cable connector is not securely fastened to the logic board connector.

One common failure mode for scale display 12 is a broken cable 36 connecting logic board 32 to scale display 12. Such a failure mode can occur when scale display 12 is a liquid crystal display that is assembled poorly with the heated melt performed at an angle, or when a sharp edge of the glass of scale display 12 cuts cable 36 when scale display 12 is being installed or handled. Another failure mode for scale display 12 is due to damage from impact from a merchandise item.

Both of these failure modes would result in separation or interruption of continuous conductor 14 and would provide feedback to an operator either through indicator 20 or display 24 that scale display 12 is inoperable. In particular, continuous conductor 14 would be sensitive to tears, cuts and misalignment of cable 36. In addition, if scale display 12 is damaged, it is likely that a crack in glass protective overlay layer 34 would extend the entire height of scale display 12 thus again causing separation or interruption of continuous conductor 14.

Thus, by sensing the conductivity of continuous conductor 14, continuity checking circuit 16 would keep an operator apprised as to the operational status of scale display 12, and replacement or repair could be performed when necessary in a timely manner.

Although the present invention has been described with particular reference to certain preferred embodiments thereof, variations and modifications of the present invention can be effected within the spirit and scope of the following claims.

What is claimed is:

1. An electronic scale comprising:

a load cell for sensing a weight of an object;

a fault-detecting electronic display module, including an electronic display for displaying the weight of the object, a cable connected to the electronic display to provide electrical power for the operation of the electronic display, and a fault-detecting line extending around at least a portion of the perimeter of the electronic display; and a controller coupled to the load cell and to the fault-detecting electronic display module.

2. The electronic scale as recited in claim 1, wherein the electronic display comprises a liquid crystal display (LCD).

3. The electronic scale as recited in claim 2, wherein the LCD comprises a liquid crystal substrate layer and a glass protective overlay layer and the fault-detecting line is positioned on the liquid crystal substrate layer under the glass protective overlay layer.

4. The electronic scale as recited in claim 3, wherein the LCD is of a generally rectangular configuration and the fault-detecting line extends around the perimeter of the LCD along three of the four sides of the generally rectangular configuration.

5. The electronic scale as recited in claim 3, wherein the LCD is of a generally rectangular configuration and the fault-detecting line extends around the perimeter of the LCD along four sides of the generally rectangular configuration.

6. The electronic scale as recited in claim 3, wherein the cable is a substantially flat multi-wire flexible electrical conductor.

7. The electronic scale as recited in claim 6, wherein the cable is connected to one side of the LCD and the fault-detecting line extends through the cable on opposite sides of the cable.

8. The electronic scale as recited in claim 1, further comprising a continuity checking circuit coupled between the controller and the cable for sensing a separation of the fault-detecting line.

9. The electronic scale as recited in claim 8, further comprising a printed circuit board containing the continuity checking circuit and a first connector which couples to a second connector on the cable.

10. The electronic scale as recited in claim 9, wherein the continuity checking circuit also senses a separation of at least a portion of the cable from the first connector on the printed circuit board.

11. An electronic scale comprising:

a load cell for sensing a weight of an object;

a fault-detecting electronic display module, including an electronic display for displaying the weight of the object, a cable connected to the electronic display to provide electrical power for the operation of the electronic display, and a fault-detecting line extending around at least a portion of the perimeter of the electronic display;

a continuity checking circuit coupled to the fault-detecting electronic display module for sensing separation of the fault-detecting line and for sensing separation of the cable from a printed circuit board within the scale;

an indicator for providing an indication to an operator that separation has occurred;

a controller coupled to the continuity checking circuit and to the load cell which receives an output signal from the continuity checking circuit when continuity checking circuit senses separation and which sends an indicator signal to the indicator to cause the indicator to provide the indication to the operator.

12. A method of detecting a failure of a display in an electronic scale comprising the steps of:

providing a fault-detection line within the display, wherein the fault-detection line has first and second ends;

extending the fault-detection line through a cable such that the fault-detection cable occupies two lines of the cable;

coupling the cable to a connector on a printed circuit board, including the substep of coupling the two ends of the two lines to corresponding first and second terminals in the connector;

checking the continuity between the first and second terminals; and alerting an operator that weight information is unreliable if a separation is sensed between the first and second terminals.

* * * * *